Figure 1:
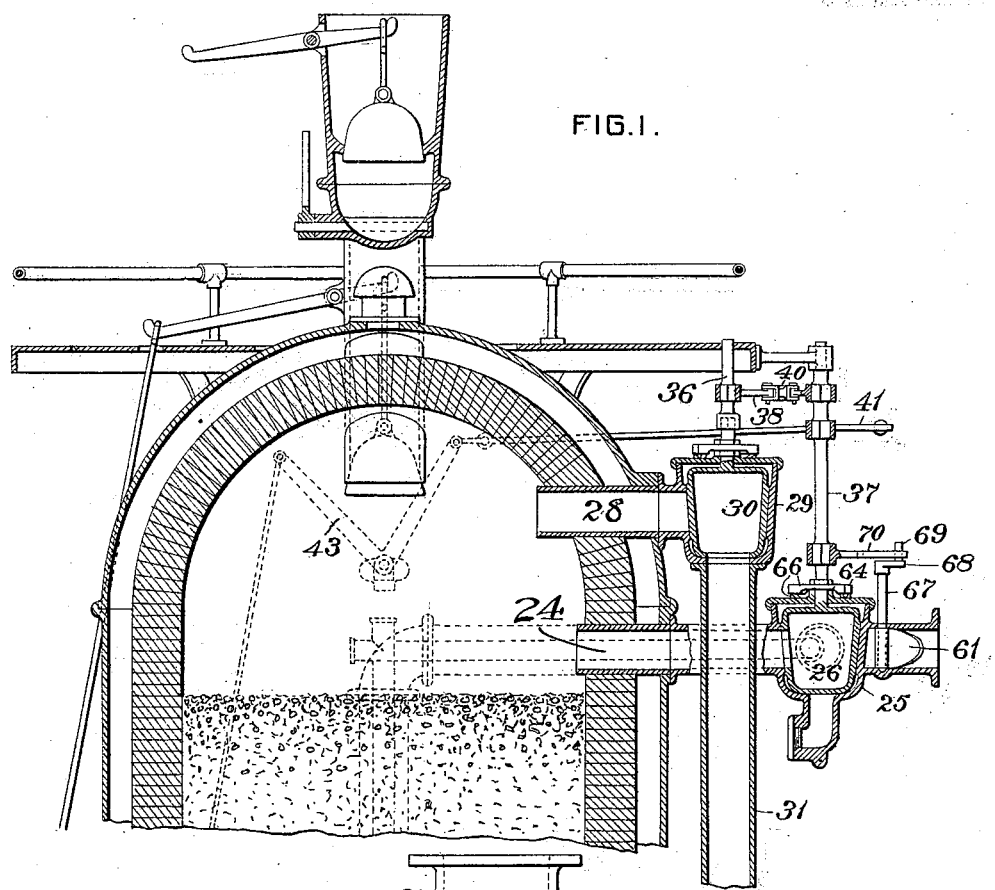

No. 644,280. Patented Feb. 27, 1900.
J. COYNE.
VALVE MECHANISM FOR GAS GENERATORS.
(Application filed Dec. 1, 1897.)

(No Model.) 4 Sheets—Sheet 1.

WITNESSES:
Chas. F. Miller
F. E. Gaither

INVENTOR,
John Coyne
by Darwin S. Wolcott
Att'y.

No. 644,280. Patented Feb. 27, 1900.
J. COYNE.
VALVE MECHANISM FOR GAS GENERATORS.
(Application filed Dec. 1, 1897.)
(No Model.) 4 Sheets—Sheet 2.
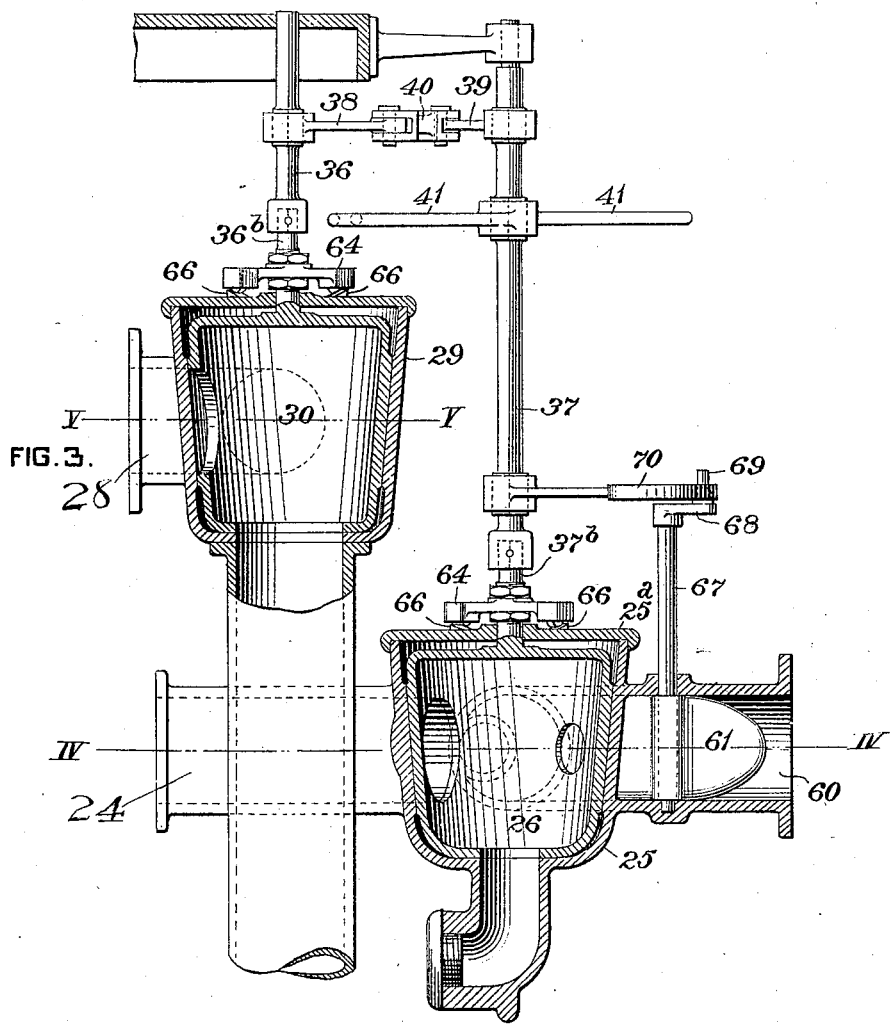
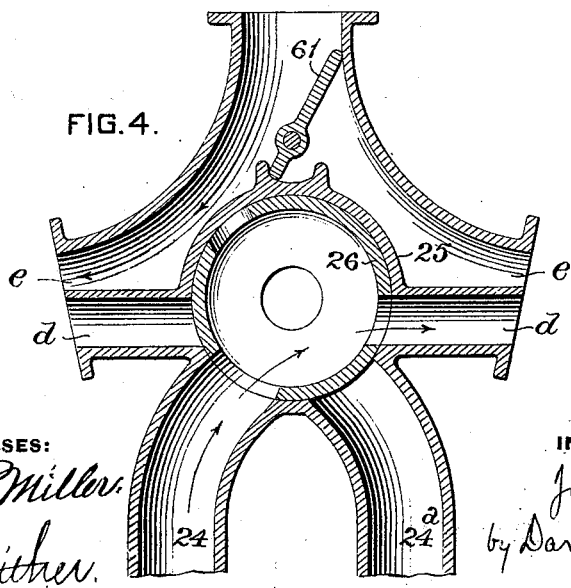
WITNESSES: INVENTOR,
Chas. F. Miller. John Coyne
F. E. Gaither. by Dannis S. Wolcott
Att'y.

No. 644,280. Patented Feb. 27, 1900.
J. COYNE.
VALVE MECHANISM FOR GAS GENERATORS.
(Application filed Dec. 1, 1897.)

(No Model.) 4 Sheets—Sheet 3.

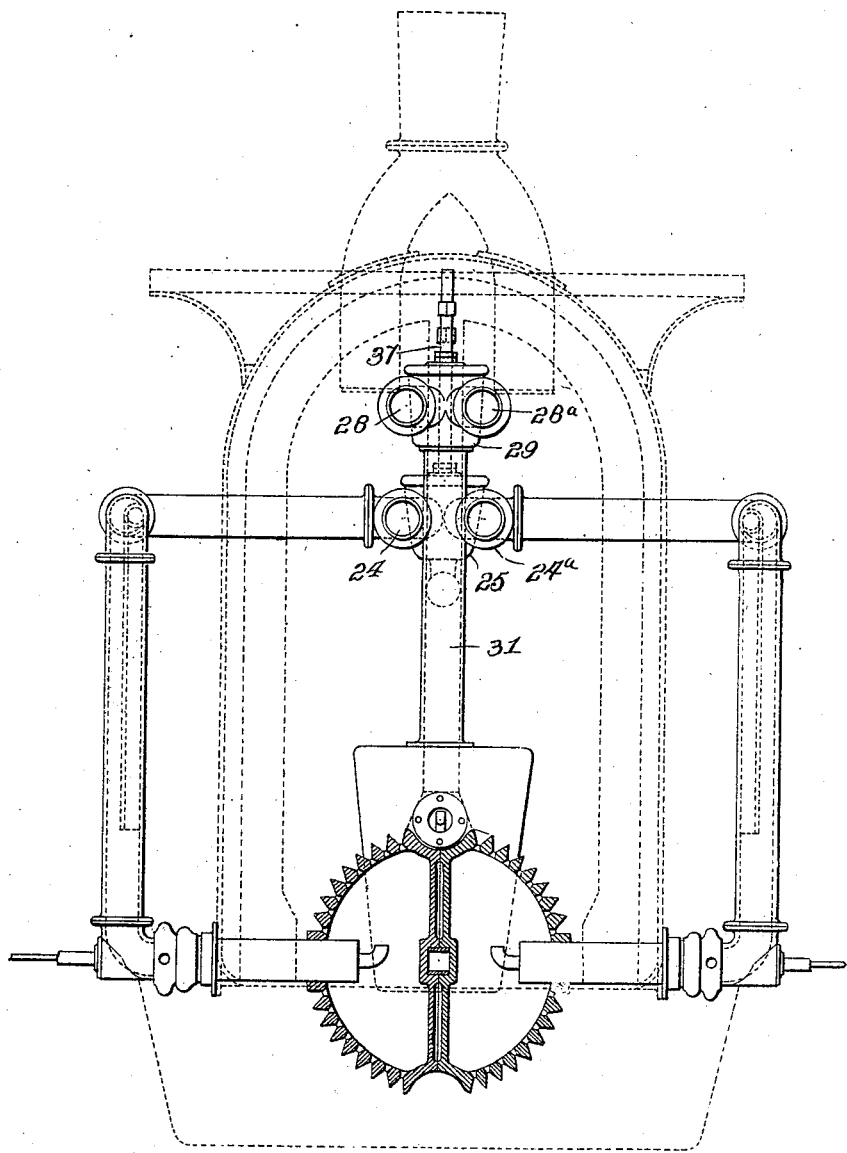

UNITED STATES PATENT OFFICE.

JOHN COYNE, OF PITTSBURG, PENNSYLVANIA.

VALVE MECHANISM FOR GAS-GENERATORS.

SPECIFICATION forming part of Letters Patent No. 644,280, dated February 27, 1900.

Application filed December 1, 1897. Serial No. 660,345. (No model.)

*To all whom it may concern:*

Be it known that I, JOHN COYNE, a citizen of the United States, residing at Pittsburg, in the county of Allegheny and State of Pennsylvania, have invented or discovered certain new and useful Improvements in Valve Mechanism for Gas-Generators, of which improvements the following is a specification.

In an application, Serial No. 614,190, filed December 2, 1897, I have shown and described a gas-generator consisting, generally stated, of two chambers or compartments formed in the same or independent structures. In operating the plant or apparatus these chambers are to be used alternately as generating and fixing chambers and are so connected together, to an air-supply pipe, and to a gas-receiver that air is forced up through the body of fuel in one chamber and the gases generated in the first chamber flow up through the body of fuel in the adjoining chamber, from which they pass to the gas-receiver. After operating in this manner for a certain period of time the air is caused to pass up through the second chamber, whence the gases generated pass to the first chamber and up through the fuel therein and then flow to the gas-receiver. In order to control and regulate this flow of air and gas, three valve mechanisms are employed, one for controlling and directing the flow of air to the chambers, one for controlling and directing the flow of gas from the then-generating chamber to the bottom of the fixing-chamber, and the third valve for regulating and directing the flow of gas from the fixing-chamber to the gas receiver or conduit. It is desirable in operating these valves that they should be moved simultaneously and also with considerable freedom of movement.

The invention described herein has for one object the construction of valve mechanisms and their operating parts or connections whereby the desired regulation and reversal may be effected simultaneously by the movement of a single operating-lever; and it is also the object of the invention to provide for a vertical movement of the valves while being shifted or rotated, so as to loosen them from their seats or to break any bond which might be formed by deposits of carbon.

The invention is hereinafter more fully described and claimed.

Figure 2:
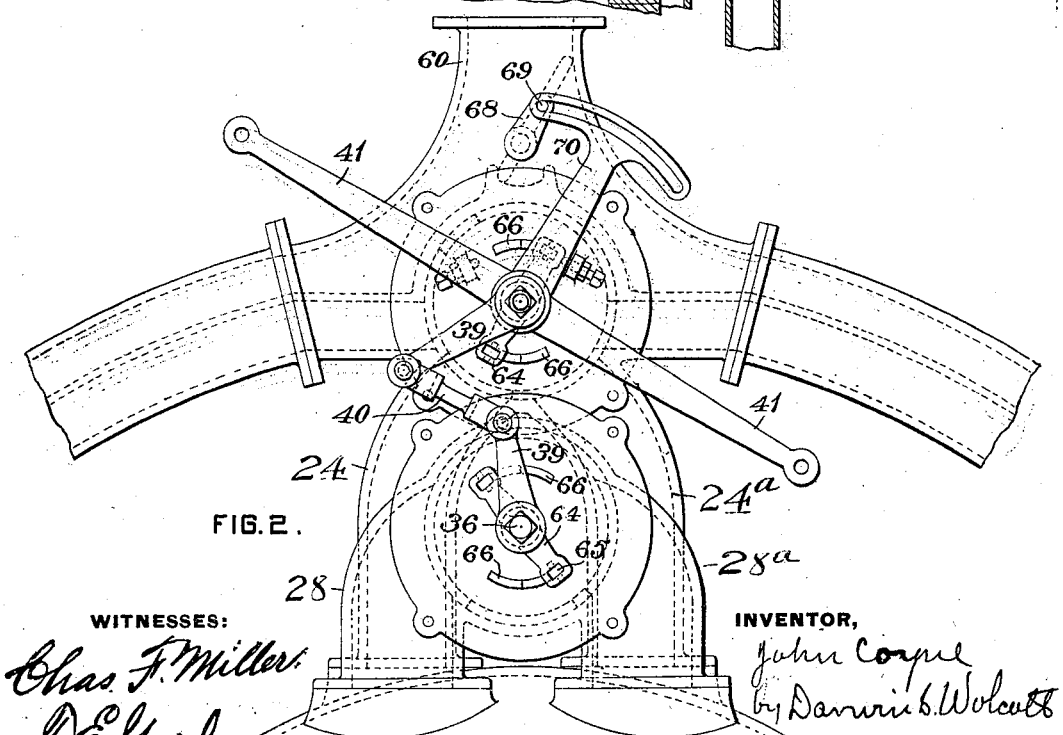
Figure 5:
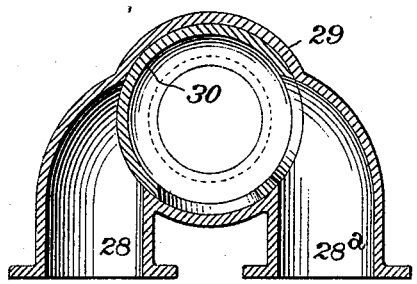
Figure 6:
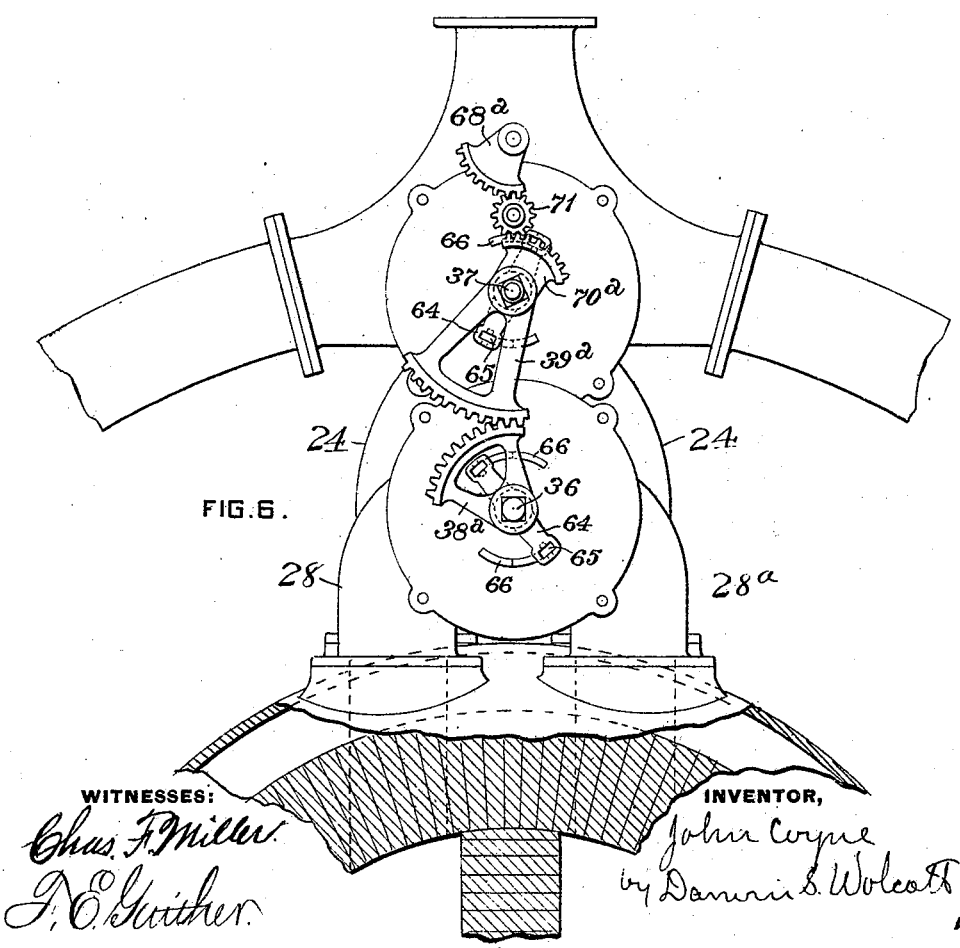

In the accompanying drawings, forming a part of this specification, Figure 1 is a sectional elevation showing the upper portion of my improved gas-generator and illustrating the positions of the valves and their operating mechanism and connections. Fig. 2 is a top plan view of the same. Fig. 3 is a sectional elevation, on an enlarged scale, of the valve mechanism. Fig. 4 is a sectional plan view, the plane of section being indicated by the line IV IV, Fig. 3. Fig. 5 is a sectional plan view of the valve controlling the flow of gas to the receiver or conduit. Fig. 6 is a plan view illustrating certain modifications in the connections between the valve mechanisms whereby they are operated simultaneously, and Fig. 7 is a diagrammatic view showing the pipe connections and valves of the generator in full lines and the generator with its division-wall in dotted lines.

In the practice of my invention the valve case or shell 25 is connected by branches 24 and $24^a$ to the upper portions of the two chambers of the generator and by pipes or branches $d$ to the lower ends of each chamber or generator. As described in said application, a passage $e$ is formed integral with the pipe or tube $d$ for conducting air to the lower ends of each of the chambers; but, if desired, a separate pipe may be employed for that purpose. Within the case or shell 25 is arranged a valve 26, which is made hollow and provided with ports adapted to register with openings in the shell 25, connected to the pipes or passages 24, $24^a$, and $d$. As shown in Figs. 1 and 3, the shell or case 25 is formed with an internal taper, and the external wall of the valve is similarly tapered, so that the latter will always have a tight fit in the shell or case. The valve is connected or formed integral with a stem $37^b$, which projects up through a cap or cover $25^a$ of the valve case or shell. While this stem $37^b$ may be made sufficiently long to permit of the attachment thereto of the operating devices to be hereinafter described, it is preferred to make it comparatively short and to form its upper end square or irregular in cross-section for the reception of a correspondingly-shaped socket on the lower end of a rod or bar 37, having its upper end mounted in a suitable bearing formed on a bracket secured to the framework of the apparatus. On this rod 37 is secured a single or double arm 41, having its outer end connected by a rod 42 to a bell-crank lever 43, which in turn is connected to an operating-lever (not shown) pivotally mounted on the case or shell of the generator. By raising and lowering this lever the valve can be shifted as required for a reversal of the direction of flow of the gas, as hereinbefore referred to. On the rod 37 is also secured an arm 39, having its outer end connected by a link 40 to an arm 38, secured upon a rod 36. The lower end of this rod 36 is provided with a socket for the reception of the upper end of a stem $36^b$, formed on or secured to the valve 30, which is made hollow and provided with ports adapted to register with ports in the shell 29, said ports in the shell being connected by pipes or tubes 28 and $28^a$, leading to the upper portions of the chambers of the generator. The valve 30 is provided with a port in its lower end, and the lower end of the case or shell 29 is also provided with a port connected by a pipe 31 to the gas receiver or conduit. The inner wall of the case or shell 29 and the external wall of the valve 30 are correspondingly tapered, so that the latter will form a tight joint with the case or shell.

In order to prevent the valves 26 and 30 from becoming wedged in their seat or being cemented thereto by a deposit of carbon, I provide for a lifting of the valves from their seats while being rotated and the lowering of them onto their seats as soon as they have been shifted to their new positions. To effect these vertical movements, the stems $36^b$ and $37^b$ have arms 64 secured thereto, said arms being preferably provided at their outer ends with antifriction-rollers 65, adapted to bear on the ribs 66, formed on the tops of the caps or covers of the shells 25 and 29. These ribs or ridges are made of a height midway of their length equal to the lift which it is desired to impart to the valves and incline in both directions from these apices. The ridges or ribs are so located and the arms 64 are so adjusted that as the valves are rotated by the mechanism hereinbefore described they will be lifted from their seats during half their rotation and then allowed to move down onto their seats during the latter part of their rotation.

The flow of air into one or the other of the chambers or compartments is controlled by a swinging valve 61, located at the junction of the passages or pipes $e\,e$. This valve or gate is secured on a rod 67, pivotally mounted and having its upper end projecting above the wall of the pipe 60, with which the pipes or passages $e\,e$ connect. On this rod 67 is secured an arm 68, provided at its outer end with a pin 69, adapted to engage a slot in the outer end of an arm 70, secured to the rod 37. By the rotation of this rod when shifting the valve 25 the valve 61 will also be reversed as required for the orderly operation of the apparatus.

As shown in Fig. 6, the simultaneous shifting of the valves 26 and 30 may be effected by securing segmental racks $39^a$ and $38^a$ on the rods 37 and 36, respectively. The valve 61 may also be operated by means of segmental racks $68^a$ and $70^a$ on the rods 67 and 37, respectively; but in order to insure the proper shifting of the swinging valve or gate 61 an idler-pinion 71 is interposed between the racks $68^a$ and $70^a$.

I claim herein as my invention—

1. In a gas-generator the combination of two chambers having their lower ends connected to an air-supply, a valve mechanism controlling the flow of air to the chambers, passages connecting the upper end of each chamber to the lower end of the other chamber, a valve mechanism controlling the flow of gas through said passages, pipes connecting the upper end of each chamber to a gas reservoir or conduit, a valve mechanism controlling the flow of gas to the reservoir or conduit and mechanism for operating said valve mechanisms simultaneously, substantially as set forth.

2. The combination of a valve-casing, a rotatable valve arranged in said casing and provided with a stem, arms secured to said stem, and inclined ridges arranged in the path of movement of said arms whereby the valve may be shifted in the direction of its axis while being rotated, the rotary and longitudinal movements of the valve being simultaneous, substantially as set forth.

In testimony whereof I have hereunto set my hand.

JOHN COYNE.

Witnesses:
F. E. GAITHER,
DARWIN S. WOLCOTT.